Patented Dec. 18, 1951

2,578,800

UNITED STATES PATENT OFFICE 2,578,800

STABILIZATION OF PYROPHORIC IRON

Victor C. Hamister, Lakewood, Ohio, assignor, by mesne assignments, to Union Carbide and Carbon Corporation, a corporation of New York No Drawing. Application January 21, 1949,
Serial No. 72,090

4 Claims. (Cl. 75—0.5)

This invention relates to the stabilization of freshly reduced iron.

It has long been known that iron can be produced by reducing a finely divided oxide of iron with hydrogen. However, the product of this reaction is highly unstable and upon exposure to the atmosphere ignites spontaneously thus being reconverted to an oxide. It is the object of this invention to provide a method for treating the reduced iron, before exposure to the air, in such a manner that the iron becomes stable and loses its pyrophoric properties.

During the reduction of iron oxide in hydrogen small quantities of the hydrogen are adsorbed by the iron. Later, when the iron with its adsorbed hydrogen is exposed to the atmosphere, this hydrogen is oxidized, liberating enough heat to raise the finely divided iron particles to their ignition temperature. To achieve the object of this invention, the oxidation of the adsorbed hydrogen is controlled by exposing the freshly reduced iron to a mixture of an inert gas or gases and small quantities of oxygen. Under such conditions, the heat liberated by the oxidation of the hydrogen is insufficient to ignite the iron, and, once the hydrogen is eliminated, the iron is no longer pyrophoric.

Thomas A. Edison in Patent 1,275,232 proposed a method of rendering hydrogen reduced iron non-pyrophoric. Edison suggested displacing the adsorbed hydrogen with an inert gas and specifically warned that the access of oxygen or air to the reduced iron must be prevented during the treatment. I have tried without success to stabilize freshly reduced iron according to his method.

Illustrative of this invention is the following experiment: A vertical tube furnace having a diameter of one inch was charged with 60 grams of iron oxide which had been crushed to 10–14 mesh granules. The iron oxide was reduced with hydrogen and the iron that remained in the furnace was cooled to room temperature. A mixture of carbon dioxide and air flowing at the rates of 2450 cc./min. and 40.5 cc./min. respectively was passed through the freshly reduced iron for one hour. The iron was then discharged into an open beaker. It was not pyrophoric.

Since the stability of the iron produced depends only on the complete oxidation of the adsorbed hydrogen it can be readily seen that any inert gas could be used to replace the carbon dioxide in the above embodiment of this invention. Similarly oxygen can be substituted for the air. It is also possible to vary the proportions of oxygen and inert gases used; however, it is essential that the amount of oxygen present be sufficient to burn the hydrogen but not so great that it will attack and oxidize the iron. Satisfactory results may be obtained with as little as 0.03% oxygen in the mixture and as much as 10% oxygen. If air instead of pure oxygen is mixed with the inert gas the ratio of air in the mixture can run from 0.15% to 50.0%. The ratios are based on the volume of the materials at standard conditions.

The product obtained from the operation described is a highly divided relatively pure iron. It can be used as a reactant in chemical processes where a large surface area is desirable to reduce the time of a reaction. The iron is also suitable for use in powder metallurgical operations in which iron particles are shaped in molds and sintered to give the finished article a coherent structure. Use can also be made of this reduced iron in the manufacture of certain batteries. Other similar uses will be apparent.

I claim:

1. The method of stabilizing pyrophoric iron obtained by the reduction of an iron oxide with hydrogen which comprises passing through the reduced iron a mixture of 0.15% to 50% by volume air, remainder inert gas.

2. The method of stabilizing pyrophoric iron obtained by the reduction of an iron oxide with hydrogen which comprises passing through the reduced iron a mixture of 0.15% to 50.0% by volume air, remainder carbon dioxide.

3. The method of stabilizing pyrophoric iron obtained by the reduction of an iron oxide with hydrogen which comprises oxidizing the hydrogen adsorbed by the iron in an atmosphere of 0.03% to 10.0% by volume oxygen, remainder inert gas.

4. The method of stabilizing pyrophoric iron obtained by the reduction of an iron oxide with hydrogen which comprises oxidizing the hydrogen adsorbed by the iron in an atmosphere of 0.03% to 10.0% by volume oxygen, remainder carbon dioxide.

VICTOR C. HAMISTER.

REFERENCES CITED

The following references are of record in the file of this patent:

UNITED STATES PATENTS

| Number | Name | Date |
|---|---|---|
| 1,001,279 | Kayser | Aug. 22, 1911 |
| 1,127,911 | Morey | Feb. 9, 1915 |
| 2,461,396 | Raney | Feb. 8, 1949 |
| 2,487,632 | Bennett | Nov. 8, 1949 |